H. M. BURDICK.
Hay Tedder.
No. 88,270.
Patented March 30, 1869.
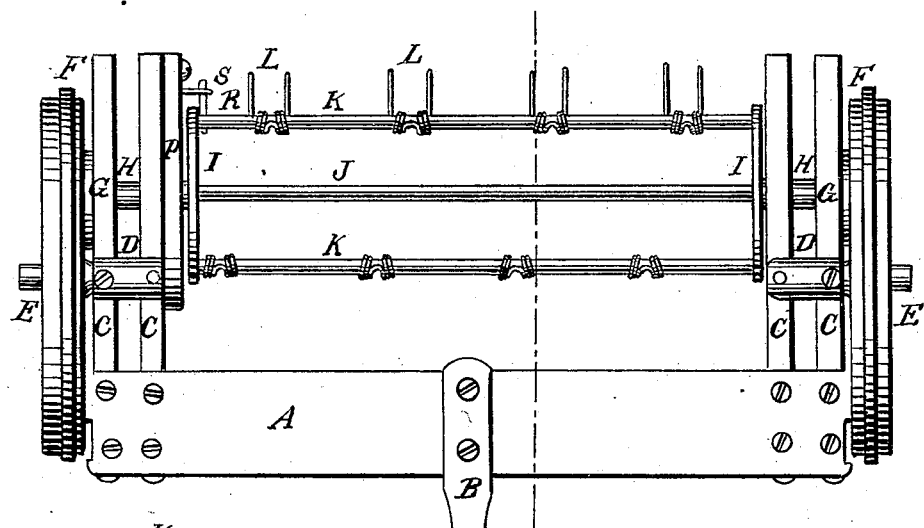
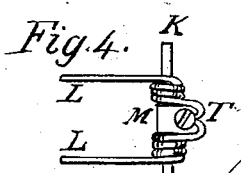
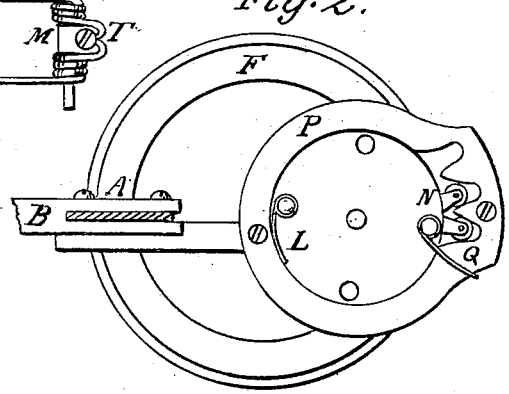
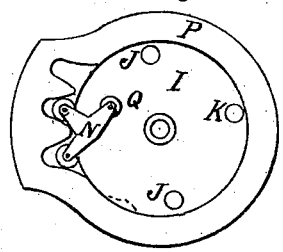
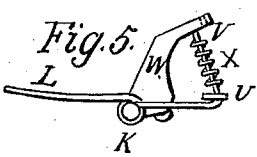
Witnesses
Wm Dennis
E. F. Rockwood
Inventor
Hiram M Burdick
By his Atty J. Dennis Jr

UNITED STATES PATENT OFFICE.

HIRAM M. BURDICK, OF ILION, NEW YORK.

*Letters Patent No. 88,270, dated March 30, 1869.*

IMPROVEMENT IN HAY-SPREADERS.

*The Schedule referred to in these Letters Patent and making part of the same.*

*To all whom it may concern:*

Be it known that I, HIRAM M. BURDICK, of Ilion, Herkimer county, in the State of New York, have invented certain new and useful Improvements in Hay-Tedders; and I hereby declare the following to be a full and exact description thereof, reference being had to the accompanying drawings, forming part of this specification.

The nature, or essence of my invention consists in giving the tedding-forks, or teeth, a vibrating, or tumbling motion, to leave or drop the hay, by means of a spider and notched circle; and in connecting the ends of the tedding-reel, or frame, by means of bars arranged near the peripheries of the end, so as to dispense with a shaft in the centre of the reel.

In the accompanying drawing—

Figure 1 is a plan or top view of a hay-tedder with my improvements;

Figure 2 is a section;

Figure 3 is a plan of the circle, or stationary cam, and the end of the tedding-reel;

Figure 4 shows a clamp for fastening the teeth to the shaft; and

Figure 5, a modification of same.

In these drawings—

A is the main bar of the frame, with the tongue, or pole B, fastened to it, to attach the animals to draw it; and, when desirable, a pair of thills may be substituted for the pole.

The side bars C C are firmly fastened to each end of the bar A, forming a strong frame, to which the other parts of the machine are fastened, or connected.

D D are pivots, fastened to the side bars C C, for the wheels E E to turn on when the machine is used.

These wheels E E have a projecting flange, F, on the inside, next to the frame, which acts on the wheels G G, to turn them and the tedding-reel.

The wheels G G are fastened to the journals H H of the tedding-reel, which turn in boxes fastened to the under side of the bars C C of the frame.

The heads I I of the tedding-reel are fastened to the journals H H, and connected by two or more bars, J J, which are firmly fastened in the heads I I.

By connecting the heads of the reel with bars, as just described, I am enabled to dispense with the centre shaft between the heads, which is liable to get wound with grass, and prevent the tedding-teeth from turning freely. It also enables me to make the tedding-teeth longer than I could if a centre shaft were used; hence, it is apparent that the dispensing with the centre shaft between the heads is a great and important improvement in the reels of hay-tedders.

The shafts K K of the tedding-teeth are fitted to turn freely in the heads I, and have the teeth L L fastened to them by clamps M, which hold them in the position desired on the shaft.

To vibrate, or tumble the shafts K and teeth L, to make them leave, or drop the hay, I fasten a three-armed spider, N, to one end of the shaft K, and put a small roller, Q, in the end of each arm, to run against the inside of the stationary circle, or cam P, fastened to one of the side bars C, as shown in fig. 1.

The circle, or cam P, is made in the form shown in fig. 3, with three notches, to receive the three arms and rollers of the spider N, and turn the shaft K, to tumble, or vibrate the teeth L, to make them drop, or leave the hay after they have raised it sufficiently.

I think the weight of the hay on the teeth L, or the weight of the teeth may be sufficient to turn the shaft K and spider N, and make the arm of the spider enter the first notch in the circle P; but, to make it certain to do so, I fasten the arm R to the shaft K, and put a pin, or stop, S, in the circle P, and arrange the arm R and pin S, so that when the roller Q comes opposite the first notch, the arm R will strike the pin S, and stop it, and tip the roller Q into the notch in the circle P, which will turn the teeth L in toward the centre of the reel, away from the hay, which will drop to the ground.

There are three notches in the circle P, and three arms to the spider N, so that the shaft K, with the teeth L, makes a complete revolution, and the teeth L come into a proper position to catch the hay before they get to the under side of the reel.

Instead of the pin and arm, a swell may be made on the inside of the circle P, as shown by dotted line in fig. 3, to raise the rear roller and tip the front roller into the first notch in the circle.

The tedding-teeth L, which act on the hay, may be made of wire, coiled around the shaft K, and fastened in a proper position on the shaft by the clamp M, made in two parts, which are drawn together by the screw T, so as to bind the clamp on the shaft, and hold the teeth. I arrange the teeth on the shaft so that if they strike the ground, stone, or other obstruction, they will spring open the coil, and pass on over the obstruction, without injuring the teeth or the machine.

Fig. 5 shows a different modification of tooth and clamp.

The tooth L is coiled around the shaft K, and its back end fastened in the bar U, which is arranged to traverse on the pin V in the end of the clamp W, which pin has a coiled spring, X, on it, to allow the tooth to yield when it meets an obstruction, and push it back when it is passed over.

If the friction of the flanges F is found insufficient to turn the wheels G and carry the reel, the inside of the flanges may be provided with teeth to act on teeth made in the wheels G; and the wheels G may be connected to the journals H by ratchet and pawls, if desired.

What I claim as my invention and improvements in hay-tedders, is—

Giving the tedding-forks, or teeth, a vibrating, or tumbling motion, to leave, or drop the hay, by means of the spider N and notched circle P, substantially as described.

HIRAM M. BURDICK.

Witnesses:
J. B. PELTON,
G. W. WARREN.